J. BADGER & H. P. BENJAMIN.

Valve for Bellows.

No. 8,780. Reissued July 1, 1879.

WITNESSES

Villette Anderson

F. J. Masi

INVENTORS

John Badger

H. P. Benjamin by E. W. Anderson their ATTORNEY

N. PETERS, PHOTO-LITHOGRAPHER, WASHINGTON, D. C.

UNITED STATES PATENT OFFICE.

JOHN BADGER AND HARVEY P. BENJAMIN, OF BELVIDERE, ILLINOIS.

IMPROVEMENT IN VALVES FOR BELLOWS.

Specification forming part of Letters Patent No. 213,375, dated March 18, 1879; Reissue No. 8,780, dated July 1, 1879; application filed May 24, 1879.

*To all whom it may concern:*

Be it known that we, JOHN BADGER and HARVEY P. BENJAMIN, of Belvidere, in the county of Boone and State of Illinois, have invented a new and valuable Improvement in Valves for Bellows; and we do hereby declare that the following is a full, clear, and exact description of the construction and operation of the same, reference being had to the annexed drawings, making a part of this specification, and to the letters and figures of reference marked thereon.

Figure 1:
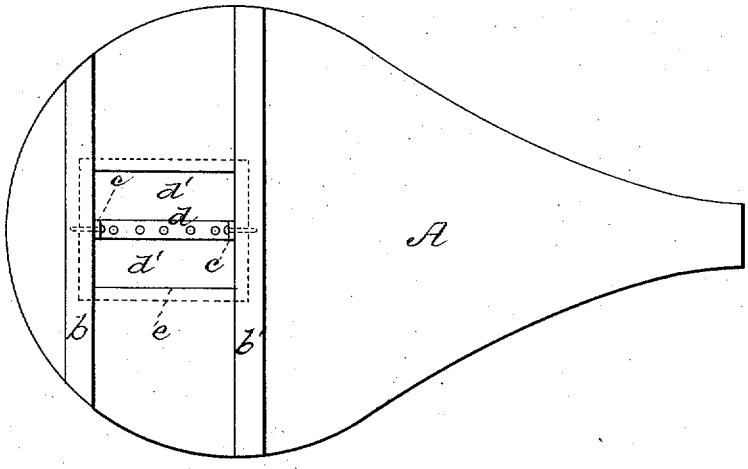
Figure 2:
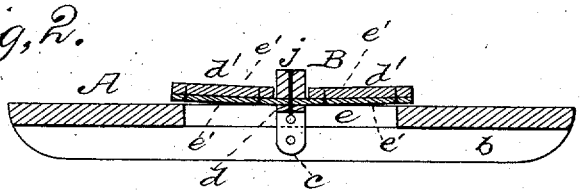
Figure 3:
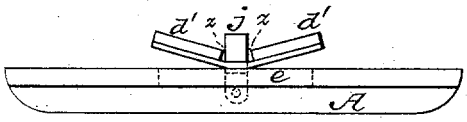
Figure 4:
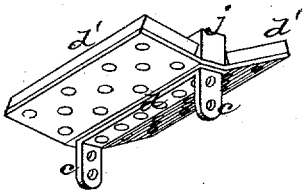

Figure 1 of the drawings is a representation of a bottom view of a bellows-board, showing our valve applied. Fig. 2 is a transverse section of the same. Fig. 3 represents the valve in section and open; and Fig. 4 is a perspective view of the valve and attachment-bar.

This invention has relation to improvements in blacksmiths' bellows; and the nature of the invention consists in the arrangement and novel construction of a double valve, hinged at its middle portion to a metallic bar extending across the valve-hole, and formed of elastic paper-board with a sheep-skin facing, whereby the valve is made very light and sensitive, as will be hereinafter more fully set forth.

In the annexed drawings, the letter A designates the plank part of an ordinary bellows, strengthened on the outside by transverse cleats *b b'*, and having formed therein a rectangular opening, *e*, between the said cleats, and bounded on two sides thereby. Spanning this opening, and secured by means of its arms *c* to the said cleats, is a metallic bar, *d*, centrally arranged, as shown in Fig. 1, thus dividing the valve-opening into two equal parts.

B designates the valve, composed of two wings, *d'*, and opening upward and closed downward against the upper side of board A. This valve is composed of a sheep-skin face, $e^2$, and of two sheets of paper-board, $e^1$, secured thereto by means of nails or tacks extending through the face and clinched upon the sheets $e^1$. These are of sufficient size to lap the edges of the opening, and are separated by a flexible part, *i*, of the facing. This double valve is placed in the opening with its flexible part *i* against the bridge-bar *d*, and clamped in position by means of a central wooden bar, *j*, and rivets extending through the whole, as shown. The wings being stiffened by the paper-board, which is extremely light, renders the valve very sensitive in opening and closing.

The central stop-bar, *j*, acts as an abutment, against which the inner edges or shoulders *z* of the paper portion rest when the valve-wings are raised, and the elastic action between the paper and wood enables them to be easily separated by the wind-pressure when the bellows is falling, so that they will close at once, allowing little or no air to escape.

We are well aware that a double-weighted pump-valve has been formed by securing metallic blocks on the upper surface of a flexible valve-piece centrally secured, and we do not claim such invention.

What we claim as new, and desire to secure by Letters Patent, is—

In a bellows having the opening *e* and the central bar, *d*, the double valve B, consisting of the leather bridge and facing $e^2$, the central wooden stop-bar, *j*, and the paper wings or stiffeners $e^1$ on said leather, and having inner edges or shoulders, *z*, adapted to bear against the stop-bar *j* when the wings are raised, substantially as specified.

In testimony that we claim the above we have hereunto subscribed our names in the presence of two witnesses.

JOHN BADGER.
H. P. BENJAMIN.

Witnesses to the signature of John Badger:
WILLIAM R. DODGE,
JOHN HANNAH.

Witnesses to the signature of H. P. Benjamin:
J. Q. ADAMS,
A. J. LUMSDEN.